O. F. & E. M. KIRKPATRICK.
EGG OR CREAM BEATING VESSEL.
APPLICATION FILED JAN. 17, 1916.
1,181,142. Patented May 2, 1916.
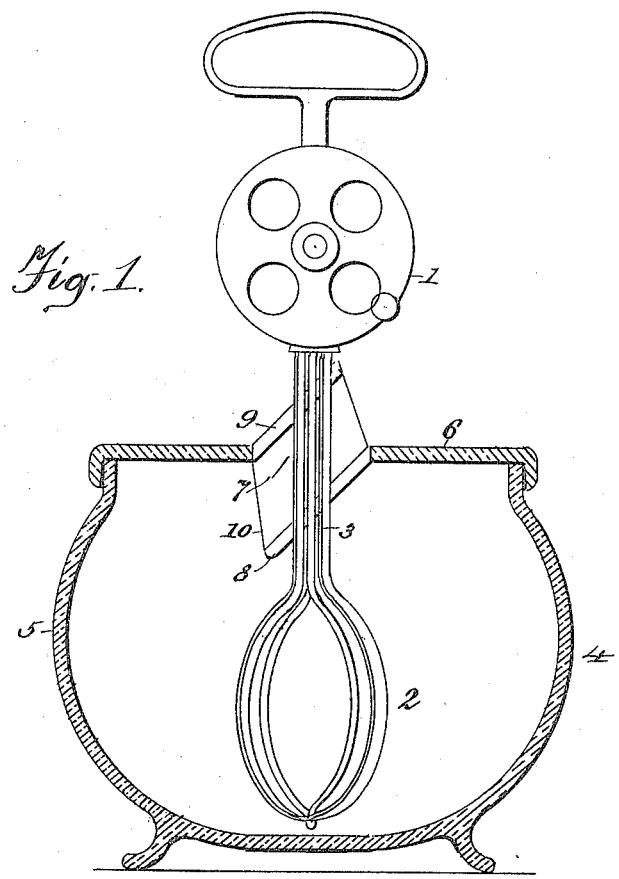
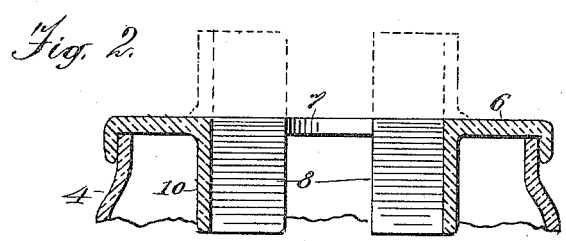

UNITED STATES PATENT OFFICE.

ORSON F. KIRKPATRICK AND ESTHER MAY KIRKPATRICK, OF NORTH ENGLISH, IOWA.

EGG OR CREAM BEATING VESSEL.

1,181,142.  Specification of Letters Patent.  Patented May 2, 1916.

Application filed January 17, 1916. Serial No. 72,432.

*To all whom it may concern:*

Be it known that we, ORSON F. KIRKPATRICK and ESTHER MAY KIRKPATRICK, citizens of the United States, residing at North English, in the county of Iowa and State of Iowa, have invented certain new and useful Improvements in Egg or Cream Beating Vessels; and we do hereby declare the following to be a full, clear, and exact description of the invention, such as will enable others skilled in the art to which it appertains to make and use the same.

This invention relates to beaters for eggs, cream, and the like, and the object of the invention is to provide a vessel and a cover therefor adapted to receive the beater when collapsed, and prevent undue splashing of the contents in the act of beating.

The invention is fully disclosed in the description and claims following, reference being had to the accompanying drawing, in which:

Figure 1 is a central section of our improved beating-bowl, as in use. Fig. 2 is a fragmentary central section, transverse to Fig. 1.

In the drawing 1 denotes an egg-beater of a familiar type, which when in a certain position is comparatively thin at the blades 2, about the thickness of the shank 3.

In the drawing the beater is shown somewhat shorter in proportion than the actual beater, so that the bowl 4 is rather more squat in form than it need be in practice. The form of the bowl is not very important, however, except that it must be wide enough at about the point 5 to allow the beater to be inserted diagonally through the cover and then to be turned to vertical position.

The main feature of the invention is the cover 6. This has an opening 7 long and wide enough to admit the blades of the beater when collapsed, and to permit the beater-shank to turn when standing upright. Adjacent to the opening are flanges 8, inclined to the top of the cover and extending far enough to practically include the width of the opening. The effect of this is to prevent the splashing up and out of the cover of the beaten material, except at the comparatively small opening occupied by the beater-shank. As the action of the beaters tends to throw the material outwardly as well as upwardly, there is very little, if any, escape of material through the cover, and the beating may be done rapidly and without wasting or scattering the contents of the bowl.

In Fig. 1 the inclined flanges are shown on the top as well as bottom of the cover, those at the top being designed to supplement the lower ones, the better to arrest the material that may be dashed upwardly. In Fig. 2 the upper flanges are not shown except in dotted outline, and in practice they might be omitted altogether, the lower flanges being depended upon entirely to arrest the upsplash. We desire therefore to claim the cover, as above described, with or without the oppositely disposed upper flanges 9. It will be seen that the flanges join the cover at the ends by webs 10, thus forming a practical housing for the shank of the beater when in use.

The device is useful in the beating of eggs, but more so in the whipping of cream, since the latter is inclined to splash a great deal, and in an open bowl the operation is mussy and troublesome.

In practice the cover of the vessel, at least, should preferably be of glass, so that the contents of the bowl may be seen and the progress of the work noted without removing the cover.

Having thus described our invention, we claim:

1. An egg-or-cream-beating vessel, comprising a bowl and cover, the cover having therein an opening of a suitable size to admit the blades of the beater when collapsed and to permit the shank of the beater to turn therein, said opening being practically spanned by inclined flanges each side of the shank-space, and the bowl being wide enough to admit the beater diagonally, substantially as described.

2. An egg-or-cream-beating vessel, comprising a bowl wide enough to admit the beater diagonally through a slot in the cover, and a slotted cover adapted to admit the beater collapsed, the slot in the cover being provided with terminal inclined flanges and connecting end-webs, whereby the beater may be inserted diagonally, turned to upright position, and then operated with little or no up-splash of the contents of the bowl.

In testimony whereof we affix our signatures in presence of two witnesses.

ORSON F. KIRKPATRICK.
ESTHER MAY KIRKPATRICK.

Witnesses:
R. S. FERRIS,
GEO. E. SWAIN.

Copies of this patent may be obtained for five cents each, by addressing the "Commissioner of Patents, Washington, D. C."